United States Patent
Vogler

(10) Patent No.: US 10,012,290 B2
(45) Date of Patent: Jul. 3, 2018

(54) BALANCING WEIGHTS WITH FERROMAGNETIC INLAY

(71) Applicant: Wegmann automotive GmbH & Co. KG, Veitshöchheim (DE)

(72) Inventor: Markus Vogler, Würzburg (DE)

(73) Assignee: WEGMANN AUTOMOTIVE GMBH & CO. KG, Veitshöchheim (DE)

( * ) Notice: Subject to any disclaimer, the term of this patent is extended or adjusted under 35 U.S.C. 154(b) by 151 days.

(21) Appl. No.: 14/879,654

(22) Filed: Oct. 9, 2015

(65) Prior Publication Data

US 2016/0102731 A1    Apr. 14, 2016

Related U.S. Application Data

(63) Continuation of application No. PCT/EP2014/057330, filed on Apr. 11, 2014.

(30) Foreign Application Priority Data

Apr. 12, 2013   (EP) ................................. 13163600

(51) Int. Cl.
    *F16F 15/32*     (2006.01)
    *B25J 15/06*     (2006.01)
    *F16F 15/34*     (2006.01)

(52) U.S. Cl.
    CPC ......... *F16F 15/324* (2013.01); *B25J 15/0608* (2013.01); *F16F 15/345* (2013.01); *F16F 2222/06* (2013.01)

(58) Field of Classification Search
    CPC .... F16F 15/324; F16F 15/345; F16F 2222/06; B25J 15/0608

USPC ......................... 301/5.21, 5.22, 53.5, 37.108
See application file for complete search history.

(56) References Cited

U.S. PATENT DOCUMENTS

| 2,697,345 | A | * | 12/1954 | Currier | F16F 15/324 301/5.21 |
| 5,048,173 | A |   | 9/1991  | Miller |   |
| 5,134,766 | A | * | 8/1992  | Miller | F16F 15/32 29/235 |
| 6,948,781 | B2 | * | 9/2005 | Sery | F16F 15/328 301/5.21 |

(Continued)

FOREIGN PATENT DOCUMENTS

| CN | 1951710 A   | 4/2007  |
| CN | 201152341 Y | 11/2008 |

(Continued)

OTHER PUBLICATIONS

International Search Report in International Application No. PCT/EP2014/057330 dated Sep. 26, 2014.

(Continued)

*Primary Examiner* — S. Joseph Morano
*Assistant Examiner* — Jean Charleston
(74) *Attorney, Agent, or Firm* — Norton Rose Fulbright US LLP

(57) ABSTRACT

A balancing weight for balancing a wheel of a vehicle has a body of non-ferromagnetic material providing a major portion of the balancing weight's mass and a ferromagnetic inlay for holding the balancing weight by magnetic force. The ferromagnetic inlay provides a minor portion of the balancing weight's mass. A weight applicator has a magnet for interacting with the ferromagnetic inlay of the balancing weight and holding the balancing weight.

19 Claims, 8 Drawing Sheets

(56) References Cited

U.S. PATENT DOCUMENTS

| | | | | |
|---|---|---|---|---|
| 8,341,231 B2* | 12/2012 | Wan | ............... | H04L 43/0811 709/206 |
| 8,628,149 B2* | 1/2014 | Lussier | ............ | F16F 15/324 301/5.21 |
| 8,807,663 B2* | 8/2014 | Prevost | ............ | F16F 15/324 301/5.21 |

FOREIGN PATENT DOCUMENTS

| | | |
|---|---|---|
| CN | 101596835 A | 12/2009 |
| CN | 101598190 A | 12/2009 |
| DE | 10 2010 008657 | 8/2011 |
| JP | S60-144503 | 9/1985 |
| JP | H11-257433 | 9/1999 |
| WO | WO/04/018899 | 3/2004 |
| WO | WO 2004/018899 | 3/2004 |
| WO | WO/10/143322 | 12/2010 |
| WO | WO/13/034399 | 3/2013 |

OTHER PUBLICATIONS

Extended European Search Report in European Application No. 13163600.3 dated Jul. 18, 2013.

Response to Extended European Search Report in European Application No. 13163600.3 dated Jul. 31, 2013.

Office Action in European Application No. 13163600.3 dated Feb. 25, 2014.

Response to Office action in European Application No. 13163600.3 dated Jul. 2, 2014.

Intent to Grant in European Application No. 13163600.3 dated Jul. 6, 2016.

Response to Notice of Intent to Grant in European Application No. 13163600.3 dated Nov. 15, 2016.

Decision to Grant in European Application No. 13163600.3 dated Dec. 15, 2016.

Intent to Grant in European Application No. 14717127.6 dated Jun. 30, 2016.

Response to Intent to Grant in European Application No. 14717127.6 dated Nov. 10, 2016.

Decision to Grant in European Application No. 14717127.6 dated Mar. 3, 2017.

Notice of Allowance issued in Korean Application No. 10-2015-7032482, dated Nov. 22, 2017.

* cited by examiner

BALANCING WEIGHTS WITH FERROMAGNETIC INLAY

PRIORITY CLAIM

This application is a continuation of co-pending International Application No. PCT/EP2014/057330 filed on Apr. 11, 2014, which designates the United States and claims priority from European Application No. 13163600.3 filed on Apr. 12, 2013, each of which is incorporated herein by reference in its entirety.

BACKGROUND OF THE INVENTION

1. Field of the Invention

The embodiments relate to balancing weights, which can be handled by an automated handling system, and which may be attached to the rim of a wheel of a vehicle for balancing the wheel. The embodiments also relate to a balancing weight applicator, which can be part of an automated handling system, for handling the balancing weights. The embodiments furthermore relate to a method for automated handling of balancing weights.

2. Description of Relevant Art

Clip-on balancing weights as disclosed in the U.S. Pat. No. 4,728,154 have a body of a metal providing mass and a clip to hold the balancing weight to the rim of a wheel.

U.S. Pat. No. 7,478,659 B2 discloses a sticker weight pressurizer for wheels. The pressurizer has two pressure blocks for pressing balancing weights to a rim of a wheel. The balancing weights are applied manually by an operator in a first step, and are firmly pressed to the rim by the pressurizer in a second step.

U.S. Pat. No. 8,182,639 B2 discloses a weight applicator for a wheel. The weight applicator has an outer arcuate surface for holding the balancing weight to be attached to the wheel by means of an adhesive. For this purpose, balancing weights having adhesives on opposing sides are required.

A dispensing device for balancing weights and a method for dispensing balancing weights is disclosed in WO 2013/034399 A1. Herein, plastic balancing weight tapes with integrated steel balls are disclosed.

U.S. Pat. No. 5,134,766 discloses an automatic weight application machine holding the balancing weights by a ferromagnetic clip.

WO 2010/143322 A1 discloses a balancing weight.

SUMMARY OF THE INVENTION

The embodiments are based on the object of improving balancing weights and applicators for balancing weights for a simplified handling of balancing weights during application to a rim. Furthermore, it is desired, if the balancing weights can be applied precisely to a predetermined position. A further objective is to reduce costs in handling of balancing weights by an applicator and to provide an improved method of handling balancing weights.

Solutions of the problem are described in the independent claims. The dependent claims relate to further improvements of the invention.

Tests have shown, on that the magnetic force which can be established to a balancing weight as known from prior art is not sufficient to hold the balancing weight at a modern handling device. Due to very short cycle times, high movement speeds and high accelerations are required. Accordingly a precise location of the balancing weights compared to the handling device and high holding forces are required.

In a first embodiment, a balancing weight comprises a balancing weight body having an inlay of ferromagnetic material, which preferably is shaped as an elongated member. The ferromagnetic inlay has a contact surface located at one side of the balancing weight body. This contact surface allows establishing a magnetic circuit with an external magnet, having a comparatively small air gap. The term air gap means herein a gap of non-magnetic material, or any material having a low magnetic permeability like air, imposing a comparatively high magnetic resistance. Due to be accessible contact surface, a high magnetic flux density can easily be established. Although it is preferred to have only one contact surface, there may be two or more contact surfaces, preferably at opposing sides of the balancing weight. One contact surface has shown to be sufficient. It is the best choice, as it has only a low impact on the design and the mechanical stability of the balancing weight.

It is preferred, that the balancing weights are coated to provide a corrosion protection and/or to cover the ferromagnetic inlays. As the thickness of two pitted coatings is in the range of some micrometers, this would not or only rarely affect the magnetic flux.

In another embodiment, a balancing weight has a body with at least one ferromagnetic inlay. The balancing weight may have a body comprising at least one of titanium, chromium, Nickel, molybdenum, tin, zinc, tungsten, aluminum. The body may also be a polymer, plastic or composite material containing mass particles of at least one of these materials. The purpose of the body is to provide a significant amount of the total mass of the balancing weight. Therefore, the body (excluding the inlay) provides the major portion of the total mass of the balancing weight, while the inlay provides the minor portion of the total mass of the balancing weight. The mass of the inlay is less than the mass of the body. The ferromagnetic inlay provides ferromagnetic properties and may interact with another ferromagnetic material or magnet in an application head. The inlay comprises at least one ferromagnetic material. Such a ferromagnetic material may be a metal based on iron, or any iron alloy, composition or compound. Preferably, the inlay has a mass of less than 50%, most preferably less than 20% of the total mass of the balancing weight. It is further preferred, if the mass of the inlay is less than 10%, most preferably less than 5% of the total mass of the balancing weight.

Some kinds of balancing weights have metal clips for holding the balancing weights to the rim of a wheel. Often, this clip is made of iron or steel, providing ferromagnetic properties. Using this clip for holding the balancing weight does not provide a high reproducibility. Instead, there is a ferromagnetic inlay within the balancing weight, which is separated from the clip. This ferromagnetic inlay should have no mechanic and magnetic connection to the clip. Instead, it should be located at a position, at which the magnetic flux is not destructed or deflected by the clip. Most preferably, the ferromagnetic inlay is for the only purpose of holding the balancing weight during delivery to a rim.

Although it is preferred that the ferromagnetic inlay is a soft magnetic material, it may also be a permanent magnetic material. It may comprise beyond iron at least one of the following materials: samarium, cobalt, nickel. The ferromagnetic inlay preferably is completely embedded within a body of the balancing weight. In an alternative embodiment, the ferromagnetic inlay may be inserted through or into a cutout in the body of the balancing weight. The cutout may be a punched, drilled, or molded hole in the balancing weight. In a further embodiment, there may be a diamagnetic material like a plastic, or a gas like air or nitrogen close to the ferromagnetic inlay for controlling the magnetic flux through the ferromagnetic inlay. The ferromagnetic inlay may be held within the balancing weight by means of an adhesive, a glue, a plastic material, by form fit or by press fit or a combination thereof. It is preferred, if the ferromagnetic inlay is a short piece of a cylinder or rod. In an alternative embodiment, the ferromagnetic inlay may be an elongated piece of a cylinder or rod.

There may be one or a plurality of ferromagnetic inlays within the body of a balancing weight. Preferably, a ferromagnetic inlay is in the center section of a balancing weight. In an alternative embodiment, at least two ferromagnetic inlays are at the outer ends and sections of a balancing weight. In chained balancing weights, not every balancing weight has a ferromagnetic inlay. Instead, every second or fourth, or any other number of balancing weights may have a ferromagnetic inlay.

According to a further embodiment, a weight applicator head has a magnet for holding a balancing weight with a ferromagnetic inlay. The applicator head may have a permanent magnet or an electrical magnet (electromagnet). It may have a coil through which a current may flow to generate a magnetic field for holding the ferromagnetic inlay of a balancing weight and therefore the balancing weight.

According to another embodiment, a method for handling balancing weights comprises the steps of moving an applicator head close to a balancing weight, holding the balancing weight by magnetic force to the applicator head, moving the applicator head together with the balancing weight to the rim, and releasing the balancing weight from the applicator head.

In a further embodiment, a method for handling balancing weights comprises the further steps of enabling an electrical magnet within the applicator head after the application head has been moved close to a balancing weight and disabling the electrical magnet within the applicator head after the balancing weight has been moved to the rim. Enabling of the electrical magnet may be done by switching on a current through the coil of the electrical magnet. A disabling of the electric magnet may be done by switching of the current.

BRIEF DESCRIPTION OF THE DRAWINGS

In the following, the invention will be described by way of example, without limitation of the general inventive concept, on examples of embodiment and with reference to the drawings.

Figure 1:
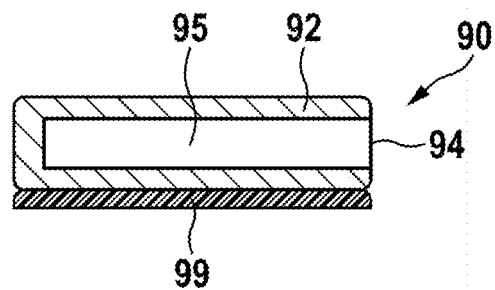
FIG. 1 shows a first embodiment of a balancing weight in a sectional view.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows a first embodiment of the balancing weight is shown in a sectional view from one side. The balancing weight has a bottom side with is designed to contact a rim of a wheel to be balanced. In this embodiment, the contact side has an adhesive tape 99 attached. In the case of a clip on balancing weight, there would be no adhesive tape. Opposing it to the contact side is a top side, which may bear a marking. In the case of an approximately rectangular balancing weight, there are four other sides. The balancing weight body 92 has an inlay 95 of ferromagnetic material, which preferably is shaped as an elongated member. Most preferably, the inlay is approximately parallel to the contact side. The ferromagnetic inlay 95 has a contact surface 94 located at one side of the balancing weight body. This contact surface allows establishing a magnetic circuit with an external magnet, having a comparatively small air gap.

Figure 2:
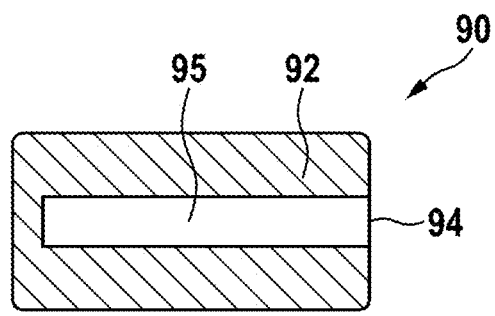
FIG. 2 shows the balancing weight in a sectional view from the top.

In FIG. 2, the previous embodiment is shown in the further sectional view from the top.

Figure 3:
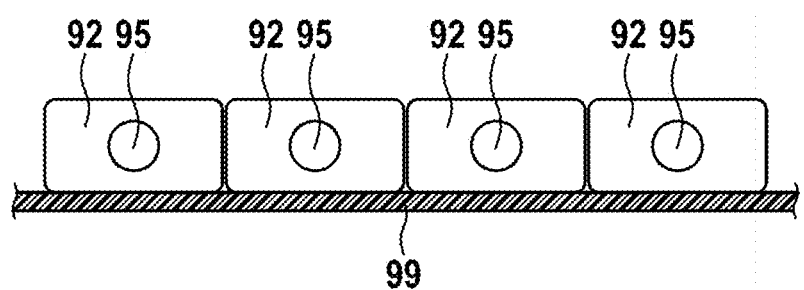
FIG. 3 shows the chain of balancing weights in a side view.

In FIG. 3, a plurality of balancing weights, forming a chain or belt is shown. The balancing weights are attached to a common adhesive tape 99. Before assembly, a required number of balancing weights may be cut or separated from the belt, maintaining its adhesive tape section. Here, the ferromagnetic inlays 95 can still be seen. It is preferred, that the balancing weights are coated to provide a corrosion protection and/or to cover the ferromagnetic inlays. As the thickness of two pitted coatings is in the range of some micrometers, this would not or only rarely affect the magnetic flux.

Figure 4:
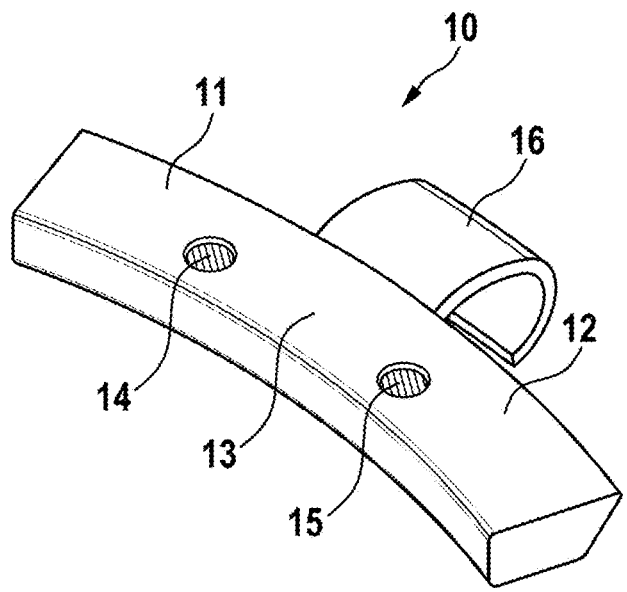
FIG. 4 shows another embodiment of a clip-on balancing weight.

In FIG. 4, an embodiment of a clip-on balancing weight is shown. The balancing weight 10 has a body comprising a center section 13, a first side wing 11 and a second side wing 12. A clip 16 for attaching the balancing weight to the rim of a wheel is attached to the center section 13 of the balancing weight. Preferably, the clip 16 is embedded into the center section 13. For holding the balancing weight by an applicator, a first ferromagnetic inlay 14 and a second ferromagnetic inlay 15 are provided. Preferably, these ferromagnetic inlays comprise a ferromagnetic material, like iron, steel or even a plastic with embedded ferromagnetic particles. The ferromagnetic inlays shown herein may be oriented towards the top surface, as shown in the figure, which improves the magnetic force to a magnetic weight applicator. Alternatively, the ferromagnetic inlays may also be covered by the weight material, or any other cover material, like a dye, a protective film, or any other coating. By using two or more ferromagnetic inlays, the position of the balancing weight with respect to an applicator head may be precisely defined. There may be an additional means for mechanically guiding the stabilizing the balancing weight.

Figure 5:
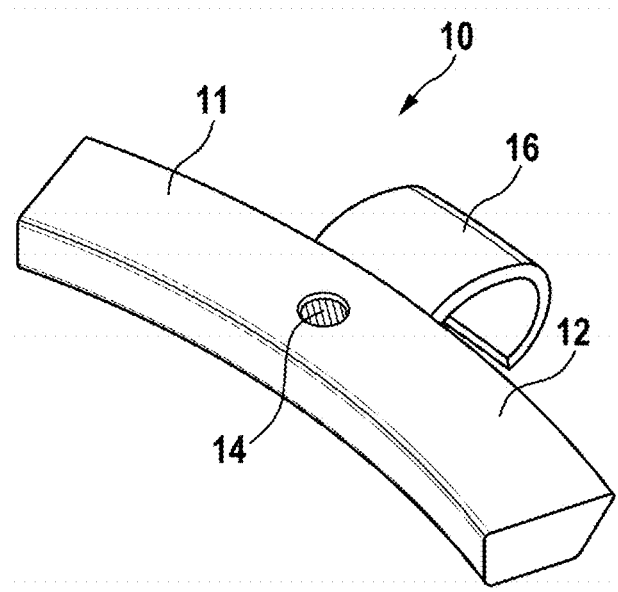
FIG. 5 shows a further embodiment of a clip-on balancing weight.

In FIG. 5, a further embodiment of a clip-on balancing weight 10 is shown. Here, only a first ferromagnetic inlay 14 is provided, preferably at the center of the balancing weight. To avoid unwanted effects, the ferromagnetic inlay must be separated, preferably magnetically separated by the clip 16, if the clip has ferromagnetic properties. If a plastic clip is used, such as separation is not necessary.

Figure 6:
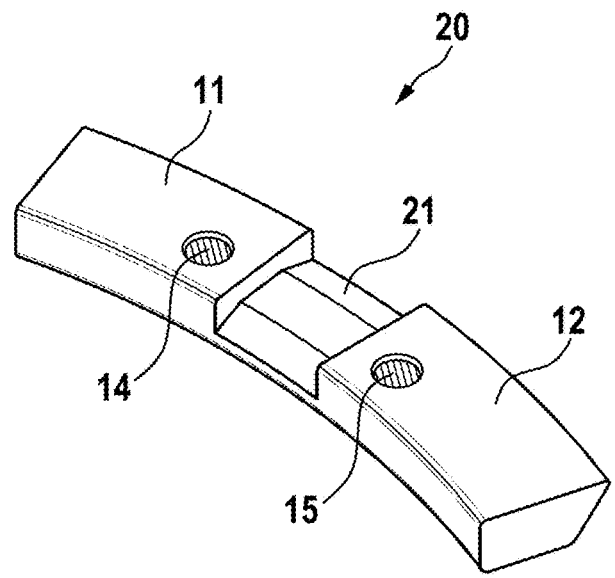
FIG. 6 shows a further embodiment of a clip-on balancing weight without clip.

In FIG. 6, a clip-on balancing weight 20 without clip is shown. The balancing weight shown herein is similar to the previously shown balancing weights. The main difference is that there is no clip provided. During the mounting process of the balancing weight to the rim, a separate clip is pushed over the balancing weight and the rim, to secure the balancing weight to the rim. For holding the clip, a recess 21, preferably at the center of the balancing weight is provided. Again, a first ferromagnetic inlay 14 and a second ferromagnetic inlay 15 are provided. Although it is preferable to have a symmetrical arrangement with two ferromagnetic inlays, a single ferromagnetic inlay would work.

Figure 7:
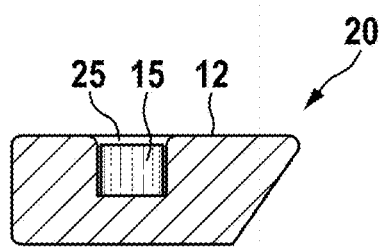
FIG. 7 shows a sectional view of a balancing weight with ferromagnetic inlay.

In FIG. 7, a sectional view of a balancing weight 20 according to any one of the previous embodiments is shown. There may be a first cutout 25 at the top of the balancing weight in which a second ferromagnetic inlay 15 is held. The cutout 25 may be manufactured during molding of the balancing weight 20, it may be punched into the balancing weight, or it may be drilled or manufactured by any other suitable way into the balancing weight 20. It may have chamfered or rounded edges to simplify insertion of the ferromagnetic inlay 15. There may be a similar cutout for a first ferromagnetic inlay and/or any further ferromagnetic inlays.

Figure 8:
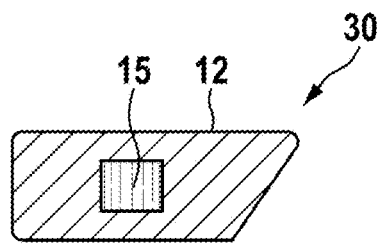
FIG. 8 shows a balancing weight with embedded ferromagnetic inlay.

In FIG. 8, a further balancing weight 30 is shown with embedded ferromagnetic inlay 15. This ferromagnetic inlay may be molded into the body of the balancing weight.

Figure 9:
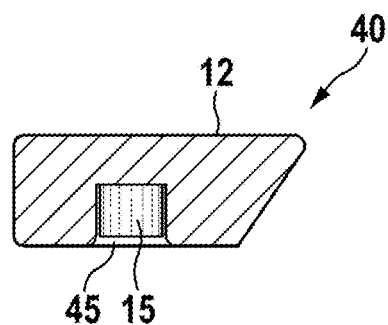
FIG. 9 shows a balancing weight with a cutout at the bottom side, holding a ferromagnetic inlay.

In FIG. 9, a balancing weight 40 with a cutout 45 at the bottom side is shown. In this cutout, a ferromagnetic inlay is held. The cutout may be manufactured as described before, and the balancing weight may be covered as described before.

Figure 10:
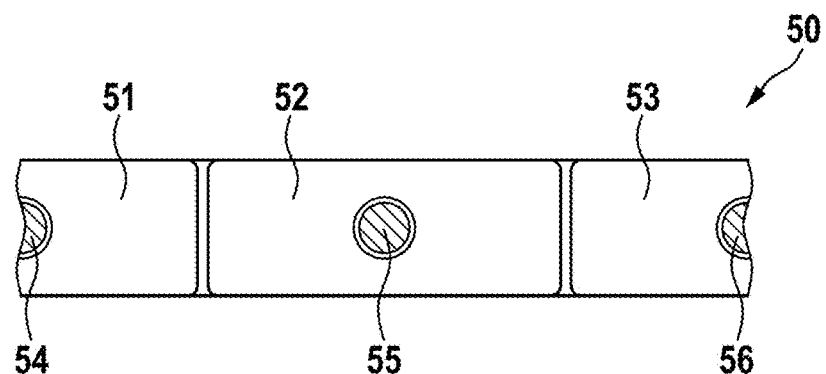
FIG. 10 shows a chain of adhesive balancing weights.

In FIG. 10, a chain 50 of self-adhesive balancing weights is shown. The balancing weights 51, 52, and 53 are preferably chained together, for example by a common self-adhesive tape under the balancing weights or by a metallic connection between the balancing weights. There may be a long chain of balancing weights from which pieces of required length may be cut off. Each of these balancing weights preferably has a ferromagnetic inlay 54, 55, and 56. There may also be segments of chained balancing weights, for example comprising of a piece of three balancing weights 51, 52, 53, which are fixedly connected to each other. In such a case, it is preferred to use ferromagnetic inlays only in one or two of the balancing weights. For example, a single magnetic inlay may be used at the center balancing weight 52 of three adjacent balancing weights, or any other number of adjacent balancing weights. In an alternative embodiment, two ferromagnetic inlays may be used at the outmost balancing weights of a chain of balancing weights. These may be the balancing weights 51 and 53 in this embodiment.

Figure 11:
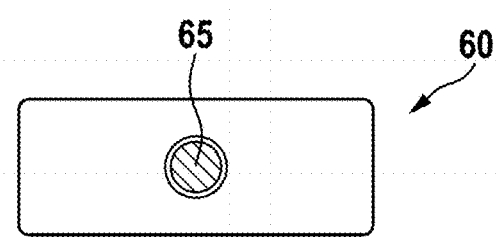
FIG. 11 shows a single adhesive balancing weight.

In FIG. 11, a single adhesive balancing weight 60 is shown. At its center, there is a ferromagnetic inlay 65. There may also be any other number of ferromagnetic inlays in this balancing weight.

Figure 12:
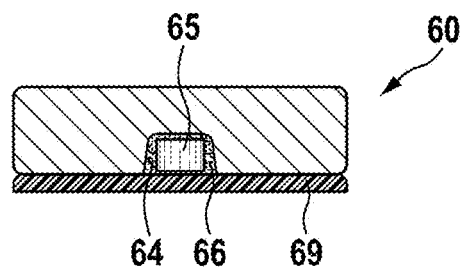
FIG. 12 shows a side view of another embodiment of a balancing weight.

In FIG. 12, a further embodiment of a balancing weight 60 is shown. Here, the ferromagnetic inlay is positioned at the bottom side of the balancing weight, which is close to the rim. To hold the balancing weight 60 to the rim, a self-adhesive tape 69 may be provided. The ferromagnetic inlay 65 is placed within a cutout 64. Between the ferromagnetic inlay and the body of the balancing weight 60, there may be gap 66. In the most preferred embodiment, the ferromagnetic inlay is held within the cutout by the adhesive tape 69. In another embodiment, there is filler, like a glue or cement, within the gap 66 to further hold the ferromagnetic inlay within the body of the balancing weight 60. It is further preferred, if the gap contains at least a ferrimagnetic material. Such a ferrimagnetic material may be air, plastic, or a similar material. Having at least a small amount of ferrimagnetic material in series with the ferromagnetic inlay would give a well-determined magnetic flow, and therefore may avoid excessive holding forces between the balancing weights and an applicator head. This may prevent sticking of the balancing weight to an applicator head.

Figure 13:
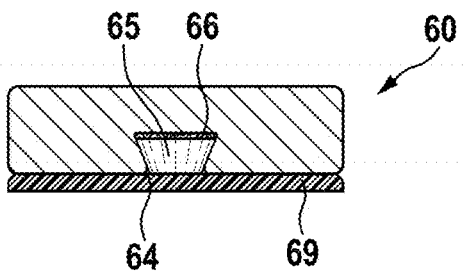
FIG. 13 shows an embodiment of a balancing weight with a modified cutout.

In FIG. 13, a further adhesive balancing weight 60 with a modified cutout 64 is shown. Here, the cutout preferably has a conical shape, into which the ferromagnetic inlay, which preferably also has an adapted conical shape, is pressed. This results in a form fit between the ferromagnetic inlay and the body of the adhesive balancing weight. In addition, here may be a gap 66. Preferably, the thickness of the gap is between 3 mm and 0.1 mm. Most preferably, the thickness is between 0.5 mm and 0.1 mm.

Figure 14:
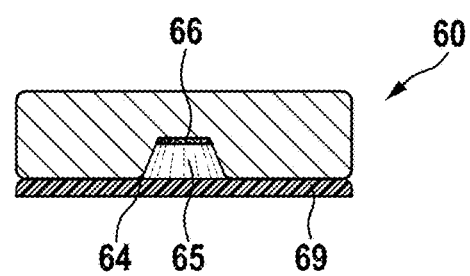
FIG. 14 shows an embodiment of a balancing weight with a further modified cutout.

In FIG. 14, a further adhesive balancing weight 60 with a modified cutout 64 in inverted conical shape is shown. It preferably is held by press fit.

Figure 15:
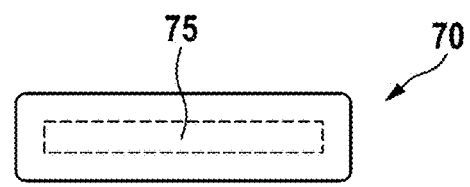
FIG. 15 shows a balancing weight with an elongated ferromagnetic inlay in a top view.

In FIG. 15, a self-adhesive balancing weight 70 with an elongated ferromagnetic inlay 75 in shown in a top view.

Figure 16:
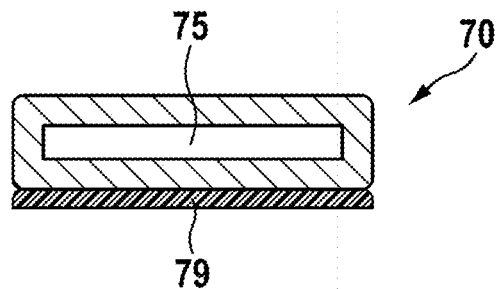
FIG. 16 shows a balancing weight with an elongated ferromagnetic inlay in a side view.

In FIG. 16, a self-adhesive balancing weight 70 with is shown. This balancing weight contains an elongated ferromagnetic inlay 75. This inlay may have the shape of a cylindrical rod. The ferromagnetic inlay may be mounted from the top side or from the bottom side, similar to the embodiments shown before. Most preferably, it is embedded into the body of the balancing weight. Preferably, there is an adhesive tape 79 to hold the balancing weight to the rim.

Figure 17:
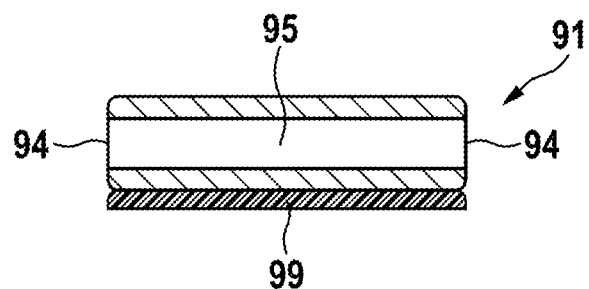
FIG. 17 shows an adhesive balancing weight with an integrated magnet.

In FIG. 17, a balancing weight 71 with an integrated magnet 76 is shown. The magnet may be mounted from the top side or from the bottom side, similar to the embodiments shown before. Most preferably, it is embedded into the body of the balancing weight. The letters N and S denote the North Pole and the south pole of the magnet. These may be exchanged in their direction.

Figure 18:
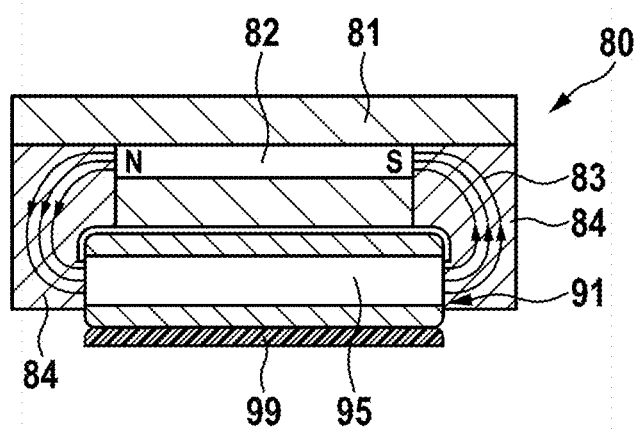
FIG. 18 shows an applicator head holding a balancing weight.

In FIG. 18, an applicator head 80 is shown, holding a balancing weight 91. The applicator head has a body 81 holding a magnet 82. Herein, a permanent magnet is shown.

Instead, a magnetic coil may be used. The magnetic field generated by the magnet 82 in the applicator head generates a magnetic flux 83 penetrating the elongated ferromagnetic inlay 95 in balancing weight 91. The magnetic flux is guided by an armature 84. By this magnetic flux, the ferromagnetic inlay 75 and therefore the balancing weight 91 is held to the applicator head 80. There may be further mechanical fixing means 89 for mechanically holding the balancing weight in a predetermined position with respect to the applicator head, so that the balancing weight may not rotate or tilt when being held by the applicator head. Dependent of or together with the fixing means 89, the orientation of the balancing weight with respect to the applicator head may be determined by the direction of the magnetic flux. The magnetic flux shown in this embodiment would try to force the elongated ferromagnetic inlay parallel to the magnet 82. Therefore, there would always be a clearly determined orientation of the balancing weight.

Figure 19:
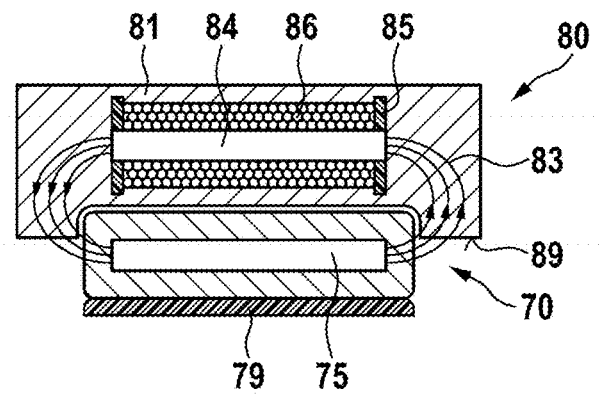
FIG. 19 shows an applicator head with an electrical magnet, holding a balancing weight.

In FIG. 19, an applicator head 80 having an electrical magnet is shown. The electrical magnet preferably has a coil 86 comprising of a plurality of windings. Preferably, the windings are held by a coil form 85. For better flux control, it is preferred to have an armature 84 within the coil. Preferably, the armature is extended to the sides of the balancing weight, like in the previous figure. In this case, the previous permanent magnet is replaced by a coil with an inner armature part. The magnetic flux 83 is similar to the magnetic flux generated by a permanent magnet, as shown in the previous figure. The magnetic force may be controlled by controlling a current flowing through the coil. Accordingly, the magnetic force may be increased or decreased. For example for picking up the balancing weight, a comparatively high magnetic force may be used; during transport, the magnetic force may be reduced; after the balancing weight has been applied to the rim, for releasing the balancing weight from the applicator head, the magnetic force may be set to zero.

Figure 20:
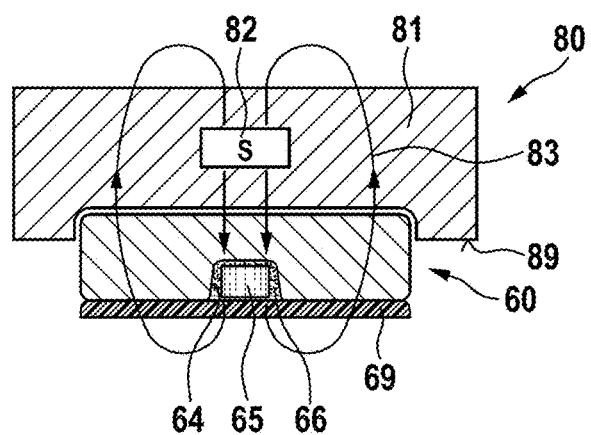
FIG. 20 shows a further embodiment of an applicator head holding a balancing weight.

In FIG. 20, a further embodiment of an applicator head 80 is shown for holding a balancing weight 60, as previously disclosed. If there is only a small and not elongated ferromagnetic inlay, it is preferred to change the orientation of the magnet 82 towards the ferromagnetic inlay as shown. The magnetic flux 83 differs in its orientation accordingly, compared to the previous embodiments. If there is a plurality of ferromagnetic inlays, a plurality of magnets may be used.

Figure 21:
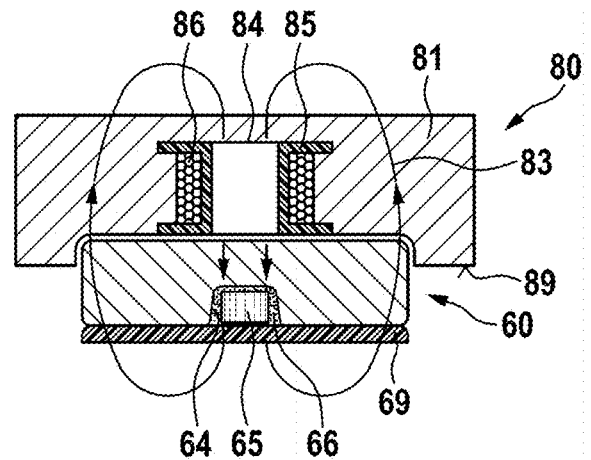
FIG. 21 shows a further embodiment of an applicator head with an electrical magnet, holding a balancing weight.

In FIG. 21, an embodiment of an applicator head 80 with an electrical magnet is shown for holding a balancing weight 60. The electrical magnet may have a winding 86 held by a coil form 85 and being centered by an armature 84. The magnetic flux 83 is similar to the magnetic flux of the previous embodiment.

Figure 22:
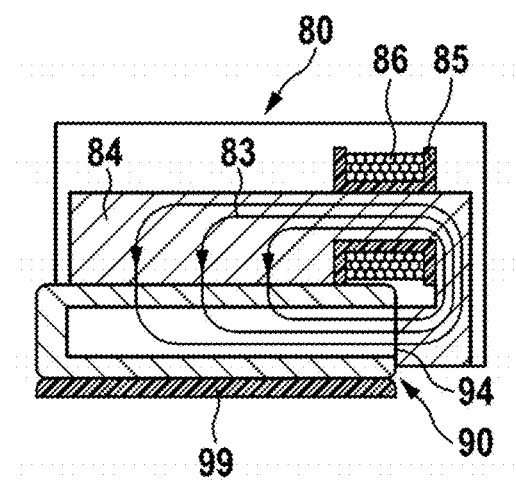
FIG. 22 shows a further embodiment of an applicator head with an electrical magnet, holding a balancing weight.

In FIG. 22, a preferred embodiment of an applicator head 80 with an electrical magnet is shown for holding a balancing weight 90. The electrical magnet may have at least one winding 86 held by a coil form 85 and being centered by an armature 84. The magnetic flux 83 goes from the armature into the ferromagnetic inlay and leaves the ferromagnetic inlay by contact surface 94 into the Armature 84.

It will be appreciated to those skilled in the art having the benefit of this disclosure that this invention is believed to provide balancing weights for vehicles. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 clip-on balancing weight
11 first side wing
12 second side wing
13 center section
14 first ferromagnetic inlay
15 second ferromagnetic inlay
16 clip
20 clip-on balancing weight
21 recess
25 cutout
30 clip-on balancing weight
40 clip-on balancing weight
45 cutout
50 chain of adhesive balancing weights
51, 52, 53 adhesive balancing weights
54, 55, 56 ferromagnetic inlay
60 adhesive balancing weight
64 cutout
65 ferromagnetic inlay
66 gap
69 adhesive tape
70 adhesive balancing weight
71 adhesive balancing weight
75 elongated ferromagnetic inlay
76 magnet
79 adhesive tape
80 applicator head
81 applicator head body
82 magnet
83 magnetic flux
84 armature
85 coil form
86 winding
89 fixing means
90 adhesive balancing weight
91 adhesive balancing weight
92 balancing weight body
94 contact surface
95 elongated ferromagnetic inlay
99 adhesive tape

The invention claimed is:
1. Balancing weight comprising:
a body of non-ferromagnetic material having a first side and a second side; and
a ferromagnetic inlay disposed in the body and configured to couple the balancing weight to a handling device by magnetic force,
wherein, in a cross-sectional plane, the first side has a first dimension that is greater than a second dimension of the second side; and
wherein the ferromagnetic inlay provides at least one contact surface located on at least the second side of the body of the balancing weight.

2. Balancing weight according to claim 1, wherein the ferromagnetic inlay comprises a cylindrical-shaped rod.

3. Balancing weight according to claim 1, wherein the ferromagnetic inlay provides one contact surface at one side of the balancing weight body.

4. Balancing weight according to claim 1, wherein a surface of the ferromagnetic inlay is parallel to an attachment side of the balancing weight body.

5. Balancing weight according to claim 1, wherein the body comprises a majority of the mass of the balancing weight, and the ferromagnetic inlay comprises a minority of the mass of the balancing weight.

6. Balancing weight according to claim 1, further comprising an adhesive tape attached to the body.

7. Balancing weight according to claim 1, further comprising:
a metal clip configured to couple the balancing weight to a rim of a wheel,
wherein the ferromagnetic inlay is physically separated from the clip.

8. Balancing weight according to claim 1, wherein the ferromagnetic inlay is covered by a cover material.

9. Balancing weight according to claim 1, wherein the ferromagnetic inlay is disposed within a cutout in the body of the balancing weight.

10. Balancing weight according to claim 9, wherein the cutout is sealed by a sealing material.

11. Weight applicator for applying a balancing weight according to claim 1, comprising:
at least one magnet configured to interact with the ferromagnetic inlay of the balancing weight to couple the balancing weight to the weight applicator by magnetic force.

12. Weight applicator according to claim 11, wherein the at least one magnet comprises at least one magnet selected from the group consisting of permanent magnets and electrical magnets.

13. Method for handling balancing weights according to claim 1, the method comprising:
moving an applicator head toward a balancing weight,
coupling the balancing weight to the applicator head by magnetic force,
moving the applicator head together with the balancing weight to a rim of a wheel, and
releasing the balancing weight from the applicator head.

14. Method for handling balancing weights according to claim 13,
the method further comprising:
enabling an electrical magnet within the applicator head after the applicator head has been moved toward the balancing weight and
disabling the electrical magnet within the applicator head after the balancing weight has been moved to the rim.

15. Balancing weight comprising:
a single-piece body with a cuboid shape having rounded corners and edges, the single-piece body comprising a non-ferromagnetic material; and
a ferromagnetic inlay configured to couple the balancing weight to a handling device by magnetic force;
wherein the ferromagnetic inlay is completely embedded in the non-ferromagnetic material of the single-piece body.

16. Balancing weight according to claim 15, wherein the ferromagnetic inlay comprises a cylindrical-shaped rod.

17. Balancing weight according to claim 15, wherein the single-piece body comprises a majority of a mass of the balancing weight, and the ferromagnetic inlay comprises a minority of the mass of the balancing weight.

18. Balancing weight according to claim 15, wherein a surface of the ferromagnetic inlay is parallel to an attachment side of the single-piece body of the balancing weight.

19. Balancing weight according to claim 15, further comprising an adhesive tape attached to the single-piece body.

* * * * *